US010560667B2

(12) United States Patent
Stadler et al.

(10) Patent No.: US 10,560,667 B2
(45) Date of Patent: Feb. 11, 2020

(54) DETECTION DEVICE, METHOD FOR DETECTION OF AN EVENT, AND COMPUTER PROGRAM

(71) Applicant: Robert Bosch GmbH, Stuttgart (DE)

(72) Inventors: Anton Stadler, Prien (DE); Julia Ebling, Hildesheim (DE); Soeren Wittmann, Affing (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/097,986

(22) PCT Filed: Mar. 22, 2017

(86) PCT No.: PCT/EP2017/056760
§ 371 (c)(1),
(2) Date: Oct. 31, 2018

(87) PCT Pub. No.: WO2017/190882
PCT Pub. Date: Nov. 9, 2017

(65) Prior Publication Data
US 2019/0149779 A1     May 16, 2019

(30) Foreign Application Priority Data

May 4, 2016   (DE) ........................ 10 2016 207 712

(51) Int. Cl.
*H04N 7/18*       (2006.01)
*G08B 17/12*      (2006.01)
*G06K 9/00*       (2006.01)

(52) U.S. Cl.
CPC ......... *H04N 7/188* (2013.01); *G06K 9/00362* (2013.01); *G08B 17/125* (2013.01); *H04N 7/185* (2013.01)

(58) Field of Classification Search
CPC ....... H04N 7/188; H04N 7/185; G08B 17/125
(Continued)

(56) References Cited

U.S. PATENT DOCUMENTS

| 6,281,790 B1* | 8/2001 | Kimmel | ........... G08B 13/19608 340/506 |
| 7,002,478 B2* | 2/2006 | Moore | ................. G08B 17/125 340/522 |
| 2014/0028803 A1* | 1/2014 | Hanses | ................ H04N 13/282 348/47 |

FOREIGN PATENT DOCUMENTS

| DE | 20022869 | 6/2002 |
| DE | 102012213125 | 1/2014 |

(Continued)

OTHER PUBLICATIONS

International Search Report for Application No. PCT/EP2017/056760 dated Jun. 2, 2017 (English Translation, 3 pages).

*Primary Examiner* — John A Tweel, Jr.
(74) *Attorney, Agent, or Firm* — Michael Best & Friedrich LLP

(57) ABSTRACT

A device and method for detection of an event in a monitoring area. The detection device includes a camera interface for transferring at least one image of the monitoring area, an image analysis unit configured to determine event specifications for at least any one position in the monitoring area, an alarm unit configured to define an alarm based on a comparison of alarm specifications with the event specifications, a storage unit configured to store the event specifications for the at least any one position, a calculation unit configured to determine at least one false event area based on the event specifications and the alarm specifications, and a masking unit configured to automatically modify the alarm specifications within the at least one false event area, exclude the false event area from the determination of event specifications by the image analysis unit, or both.

14 Claims, 2 Drawing Sheets

(58) Field of Classification Search
USPC .................................................... 340/573.1
See application file for complete search history.

(56) References Cited

FOREIGN PATENT DOCUMENTS

| | | |
|---|---|---|
| DE | 102014219838 | 3/2016 |
| JP | 2012005043 A | 1/2012 |
| JP | 2015130698 A | 7/2015 |
| JP | 2016033717 A | 3/2016 |
| WO | 02054364 | 7/2002 |

* cited by examiner

DETECTION DEVICE, METHOD FOR DETECTION OF AN EVENT, AND COMPUTER PROGRAM

BACKGROUND OF THE INVENTION

The invention relates to a detection device for detection of an event in a monitoring area, with a camera interface for transferring at least one image, wherein the at least one image shows the monitoring area, with an image analysis unit, wherein the image analysis unit is configured to determine event specifications for any position in the monitoring area on the basis of the image, with an alarm unit with alarm specifications, wherein the alarm unit is configured to output an alarm on the basis of a comparison of the alarm specifications with the event specifications, with a storage unit, wherein the storage unit is configured to store the event specifications for each position in the monitoring area. The invention furthermore relates to a method for detection of an event in a monitoring area, and also a computer program.

A multiplicity of detection systems are based on the camera-based and/or video-based detection of events. Detection systems of this type are used, in particular, in fire detectors. For example, a multiplicity of fire detectors of this type which detect a fire on the basis of meaningful fire characteristics have now become known.

Document DE 10 2014 219 838 A1, for example, which also forms the closest prior art, discloses a smoke detection device for detection of smoke of a fire in a monitoring area, wherein the smoke detection device comprises an evaluation module which carries out a first movement estimation for determining a movement of a smoke section in the monitoring area on the basis of two individual images, wherein the two individual images have a first time interval between them.

SUMMARY OF THE INVENTION

According to the invention, a detection device is proposed, a method, and also a computer program. Preferred or advantageous embodiments of the invention can be found in the claims, the following description and the attached figures.

According to the invention, a detection device is proposed which is configured and/or suitable for detection of an event in a monitoring area. The event is, for example, a flame, a fire or smoke. Alternatively or additionally, the event may be a moving person and/or a moving animal in the monitoring area. The monitoring area may be an enclosed monitoring area such as, for example, a room in a house and/or a hall of a factory. Alternatively, the monitoring area may be an outdoor area, such as, for example, a parking lot. The detection device is configured, in particular, as a digital data processing device, such as, for example, a computer, a microcontroller, etc.

The detection device comprises a camera interface for transferring at least one image, wherein the at least one image shows the monitoring area. The camera interface can be configured as an internal or as an external camera interface. The at least one image can be transferred by the camera interface in a wireless or wired manner. The camera interface is preferably configured as a radio interface. In particular, the camera interface can represent a network connection. The camera interface preferably transfers an image sequence, wherein the image sequence comprises a plurality of individual images as images. In particular, the individual images show the monitoring area and all individual images in each case preferably show the same section of the monitoring area. The at least one image of the monitoring area can be provided by a monitoring camera, in particular a stationary monitoring camera. The monitoring camera is configured, for example, as a camera which records images in the visible range or an infrared camera. The at least one image is provided, in particular, as a digital image. The at least one image can be configured as a black and white image, as a greyscale image, and/or as a color image.

The detection device comprises an image analysis unit, wherein the image analysis unit is configured to determine event specifications for any position in the monitoring area based on the at least one image. The image analysis unit is preferably implemented as a software module. Alternatively, the image analysis unit can also be implemented in the form of hardware. The image analysis unit is preferably configured to divide the monitoring area into a grid containing grid positions and to assign position coordinates to the grid positions in the monitoring area. The division into a grid is carried out, for example, in the form of a matrix. In particular, a grid position can be assigned to each position in the monitoring area, wherein each position in the monitoring area can therefore be described in grid coordinates. In particular, the image analysis unit determines the event specifications for each grid position.

The event specifications are, in particular, data which meaningfully characterize the events that are to be detected in the monitoring area. An event can preferably be distinguished from a false event via the event specifications, wherein a false event is, for example, an event which has similarities with an event that is to be detected for the detection device. For detection of a flame and/or a fire in the monitoring area, the event specifications may comprise, for example, the spectral distribution of the intensity of the thermal radiation. For detection of moving animals and/or persons in the monitoring area, the event specifications may comprise, for example, the speed of the moving object as an absolute amount and as a direction vector.

The detection device comprises an alarm unit, wherein the alarm unit comprises and/or has stored alarm specifications. The alarm unit is implemented in the form of a program and/or hardware. The alarm unit is preferably combined with the image analysis unit in a common evaluation unit. The alarm unit is configured to output an alarm on the basis of a comparison of the alarm specifications with the event specifications. The alarm specifications are to be understood, for example, as limit values, the exceeding and/or under-stepping of which by the event specifications result(s) in the output of an alarm. The alarm specifications are, for example, a maximum spectral temperature, a maximum speed of a moving object and/or a turbulence in a moving object. In particular, the alarm specifications may be dependent on the position in the monitoring area and/or may be selected as identical for all positions in the monitoring area.

The detection device comprises a storage unit, wherein the storage unit is configured to store the event specifications for a position in the monitoring area. The storage unit can be configured as an internal or an external storage unit. The storage unit is preferably a data storage unit. In particular, the storage unit is configured as an internal and/or external hard disk, as a USB storage medium, as a memory card, as a CD or DVD. The storage unit preferably stores the event specifications for each position in the monitoring area and/or grid position. The storage unit is preferably configured to provide the event specifications for a position with a timestamp so that, for example, the variation with time of the event specifications is stored for a position.

The detection device comprises a calculation unit for calculating and/or defining at least one false event area on the basis of the event specifications and the alarm specifications. The false event area is an area of the monitoring area in which an event that is to be detected is detected for the selected alarm specifications even though the event has not actually occurred. The false event area is, for example, an area with a flickering light source, in particular a fluorescent tube, in which a fire is erroneously detected by the detection device on the basis of the flickering light. For persons and/or animals that are to be detected in the monitoring area, a false event may be formed, for example, by moving shadows and/or falling leaves. The calculation unit may consist of software or hardware. In particular, the calculation unit may form a common evaluation unit together with the storage unit and/or the alarm unit and/or the image analysis unit. The calculation unit calculates and/or defines a false event area on the basis of the knowledge, which has been provided, for example, by a user, that the event has not occurred for all hitherto stored event specifications.

The detection device comprises a masking unit for the automatic modification of the alarm specifications within the at least one false event area and/or for the exclusion of the false event area from the determination of event specifications by the image analysis unit. The masking unit is configured as software and/or hardware. In particular, the masking unit may form a common evaluation unit together with the calculation unit, the storage unit, the alarm unit and/or the image analysis unit.

One consideration of the invention is that, on the basis of the knowledge that no event has occurred in the monitoring area for the stored event specifications, the alarm specifications can be adjusted and/or the false event area is excluded from the determination of event specifications by the image analysis unit in such a way that false events are subsequently no longer detected as events. A concept is thus proposed in respect of how critical image areas can be eliminated and/or differently evaluated. The triggering of a false alarm by falsely detected events can thus be significantly reduced. The automatic adjustment of the alarm specifications and/or the automatic exclusion of an area from the further determination of event specifications furthermore result(s) in a considerable time saving compared with the manual setting of areas which are intended to be excluded.

In one possible design of the detection device, the modification of the alarm specifications is characterized in that it is a non-evaluation of a false event area by the alarm unit. For this purpose, for example, for an alarm unit which checks whether the alarm specifications have been exceeded by the event specifications, the alarm specifications in the false event area are set to infinity and/or to a very high value so that the event specifications in the false event area can no longer exceed the alarm specifications. Conversely, for example, the alarm specifications for an alarm unit which checks whether the alarm specifications have been understepped by the event specifications the alarm specifications are set to zero or to a value which is so low that the event specifications cannot understep the alarm specifications.

In one particularly preferred design of the invention, the event specifications comprise information relating to the magnitude, duration and/or intensity of an event and/or false event. Alternatively or additionally, the event specifications may comprise further information relating to an event, such as, for example, a speed, a direction, a temperature and/or a turbulence determined at a position in the monitoring area.

In particular, the event specifications have the same dimension and/or unit as the alarm specifications. The event specifications may furthermore comprise a combination of a plurality of information elements.

In one possible design of the invention, the calculation unit is configured, following a manual modification of the alarm specifications, to recalculate and/or redefine the at least one false event area on the basis of the stored event specifications and modified alarm specifications. Alternatively or additionally, the recalculation or redefinition of a false event area can also be triggered manually. Following a manual modification of the alarm specifications, for example, the calculation unit recalculates for the entire monitoring area where an event would be detected on the basis of the new alarm specifications even though no event has occurred, and therefore where a false event area is located.

In one particularly preferred design of the invention, the detection device comprises a user interface. The user interface is configured as a man-machine interface for modification of the alarm specifications, in particular for the manual modification of the alarm specifications. The user interface is designed, for example, as an embedded computer. In particular, the user interface comprises a data input unit such as, for example, a keyboard. Alternatively or additionally, the user interface comprises a touchscreen as a data input unit. The user interface preferably has a data connection to the alarm unit, wherein the data connection may be designed as wired and/or wireless. It is thus possible to dispose the user interface separately from the marking unit, calculation unit, storage unit, alarm unit and/or image analysis unit. The user interface is disposed, for example, in a control room and the remainder of the detection device is disposed in a monitoring camera in the monitoring area.

It is particularly preferred that the user interface comprises a display unit for the graphical display of the monitoring area as a display image. The graphical display can be configured as a color display, greyscale display, or black and white display. The display unit is preferably designed as a screen and preferably as a touchscreen monitor. The display unit shows, in particular, the image of the monitoring area provided by the camera interface. The display unit is configured for the graphical display in the display image of the false event area(s) calculated and/or defined for the respective currently set alarm specifications. The false event areas can be displayed, for example, by a coloring and/or shading of the area concerned in the display image or in the image of the monitoring area. In particular, the display unit can be configured to present false event areas for different alarm specifications in the display image, wherein the presentation is performed for different alarm specifications, for example through different coloring and/or hatching.

In a further design of the invention, the user interface is configured to define manually by means of user input at least one area of the monitoring area as an additional false alarm area. If, for example, a user knows that false events frequently occur in one area of the monitoring area, the user can mark this area via the user interface as a false alarm area and thus trigger the marking unit to modify the alarm specifications within the false event area marked by the user and/or to exclude the false event area marked by the user from the determination of event specifications by the image analysis unit. In particular, the manual user input can be performed through graphical marking of the corresponding area in the display image, or through input of coordinates.

In one possible design of the invention, the detection device comprises an adjustment unit. The adjustment unit is provided, in particular, as a software and/or hardware implementation and is, for example, integrated into the user interface. The adjustment unit is configured to adjust and/or readjust the alarm specifications in such a way that a false event is not detected as an event for the stored event specifications in the monitoring area and in the knowledge that no event has been detected in the monitoring area for the stored event specifications. The adjustment unit can, in particular, adjust/readjust the alarm specifications on an area-by-area and/or position-dependent basis. The adjustment unit can, for example, readjust the alarm specifications in a detected false event area in such a way that no false event is detected for the readjusted alarm specifications.

In one particularly preferred design of the invention, the event is a fire and/or flame in the monitoring area. The spectral distribution of the temperature, for example, recorded by an infrared camera in particular, serves as event specifications for a fire and/or flame in the monitoring area. Alternatively or additionally, specific light phenomena can be selected as event specifications.

In one further design of the invention, the event that is to be detected is smoke in the monitoring area. The smoke is formed, in particular, by a fire and/or flame in the monitoring area. The smoke is formed by smoke emission, in particular by combustion products of the fire. The optical flow of the smoke and/or of a section of the smoke, for example, can be selected as event specifications for smoke.

In a further design of the invention, the event that is to be detected in the monitoring area is a moving person and/or a moving animal. The speed, for example, as an absolute amount and as a direction vector, of a moving object in the monitoring area is selected as event specifications.

A further subject-matter of the invention relates to a method for detection of an event in a monitoring area which is preferably implemented by the detection device. In the method, an image of the monitoring area is evaluated and event specifications are determined for any position in the monitoring area. An alarm is output on the basis of a comparison of the event specifications with alarm specifications. The event specifications are stored, wherein the respective position at which they were determined is stored for the event specifications. The location of a false event area in the monitoring area is calculated and/or defined on the basis of the event specifications and the alarm specifications. The alarm specifications are automatically modified within the false event area and/or the false event area is excluded from the determination of event specifications.

A further subject-matter of the invention is formed by a computer program product with program code means to carry out the previously described method, preferably on a detection device or on a data processing system.

BRIEF DESCRIPTION OF THE DRAWINGS

Further features, effects and advantages of the invention can be found in the following description of a preferred example embodiment of the invention and in the attached figures, in which.

DETAILED DESCRIPTION

Figure 1:
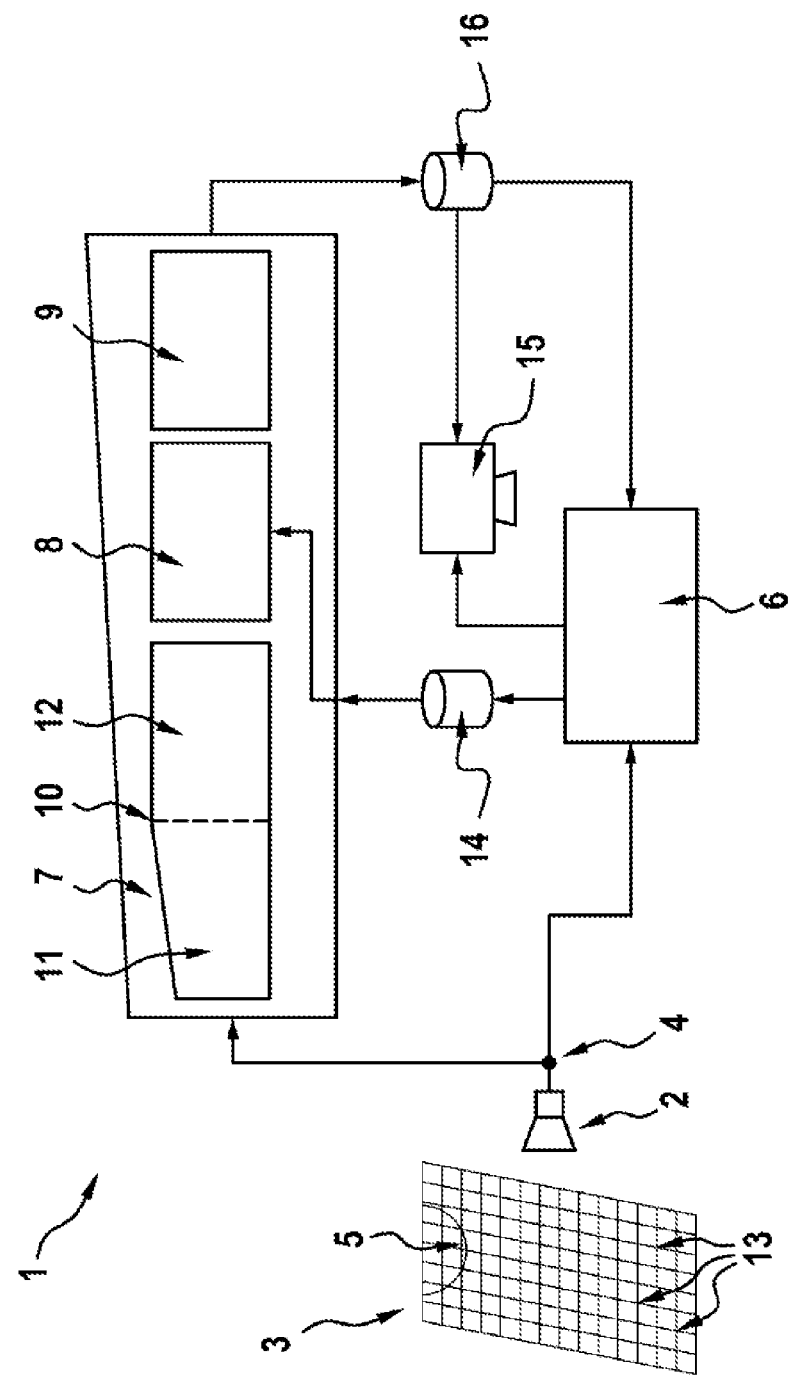
FIG. 1 shows a schematic representation of a detection device.

FIG. 1 shows a substantially schematized representation of a detection device 1 as an example embodiment of the invention. The detection device 1 is configured as an automatic fire detector and can be implemented, for example, as a computer or a digital data processing system with a computer program for the implementation of the individual modules.

FIG. 1 furthermore shows a monitoring camera 2, wherein the monitoring camera 2 is disposed in such a way that it covers a monitoring area 3. The monitoring camera 2 can be configured as a black and white camera, a color camera or an infrared camera. The monitoring camera 2 may optionally form an integral part of the detection device 1. The monitoring camera 2 provides at least one image of the monitoring area 3 via a camera interface 4 of the detection device 1. The monitoring camera 2 is configured, in particular, to provide an image sequence consisting of a plurality of images of the monitoring area 3, wherein the images of the image sequence represent a common section of the monitoring area 3. The images of the image sequence are recorded at a time interval, wherein the time interval is a fixed time interval which is determined by the frequency of the monitoring camera 2. The monitoring camera 2 is configured, for example, to record an image sequence with at least two images of the monitoring area 3 at a frequency of 30 Hertz.

The monitoring area 3 comprises a false event area 5, wherein the false event area 5 is an area of the monitoring area 3 for which the detection device 1 detects an event, in this example embodiment a fire even though no event or fire is taking place in the monitoring area 3. The false event area 5 is, for example, an area of the monitoring area 3 which simulates a fire for the detection device 1 by means of a flickering light source, such as, for example, a fluorescent tube.

The images of the monitoring camera 2 of the detection device 1 are made available via a camera interface 4. The camera interface 4 has a data connection to an image analysis unit 6 and an evaluation module 7. The evaluation module 7 comprises a calculation unit 8, a masking unit 9 and a user interface 10 with a display unit 11 and an input unit 12.

The image analysis unit 6 is configured to divide the monitoring area 3 into a grid using software and/or hardware on the basis of the image provided via the camera interface 4. The division of the monitoring area 3 into a grid corresponds to a matrix-type division into grid positions 13, wherein grid coordinates are allocated to each grid position 13 by the image analysis unit 6. Three random grid positions 13 are drawn by way of example in the figure. The image analysis unit 6 is furthermore configured to determine event specifications for each grid position of the monitoring area 3. The event specifications comprise, for example, the spectral distribution of the temperature at a grid point, the brightness and/or further characteristic features of a fire.

The image analysis unit 6 has a data connection to a storage unit 14 for storing the event specifications in the storage unit 14. The storage unit 14 is implemented, in particular, as a storage medium integrated into the detection device 1, such as, for example, a hard disk. Alternatively, the storage unit 14 can also be configured as an external storage medium, wherein the external storage medium is connected, for example, via a radio link to the image analysis unit 6. The event specifications are stored, in particular, together with the position in the monitoring area 3 and/or together with the grid position 13 at which they were determined. The event specifications are therefore assigned and/or stored, for example, for each grid point. In particular, the storage unit 14 is configured to provide the event specifications with a timestamp so that the event specifications are storable over a substantial period of time and, for example, the variation with time of the event specifications is thus determinable.

The image analysis unit 6 has a data connection to an alarm unit 15. The alarm unit 15 is configured using software or hardware to output an alarm on the basis of a comparison of the event specifications with alarm specifications stored in the alarm unit 15. To do this, the alarm unit 15 compares the event specifications with the alarm specifications, for example, at each grid position 13. The alarm unit outputs an alarm as soon as the event specifications exceed or understep the alarm specifications. The alarm output by the alarm unit 15 may be a visual and/or audible signal.

The storage unit 14 has a data connection to the calculation unit 8. The calculation unit 8 is configured to determine a false event area 5 on the basis of the event specifications and the alarm specifications. To do this, the calculation unit 8 makes use of the information indicating that no fire and/or event has occurred in the monitoring area 3 for the stored event specifications. This information indicating that no fire and/or event has occurred in the monitoring area 3 for the stored event specifications is provided, for example, by a user. The calculation unit 8 is configured to provide the information relating to calculated and/or defined false event areas 4 in the monitoring area 3 to the masking unit 9.

The masking unit 9 has a data connection to the alarm unit 15. The masking unit 9 is configured to modify the alarm specifications in the alarm unit 15 in such a way that, for the alarm specifications reset by the masking unit 9, an event with the corresponding event specifications which resulted in the definition and/or calculation of the false event area 5 is no longer regarded as an event or a fire by the alarm unit.

The masking unit 9 similarly has a data connection to the image analysis unit 6 in order to exclude the area of the false event area 5 determined by the calculation unit 8 from the determination of event specifications by the image analysis unit 6. The data volume generated by the image analysis unit 6 can thus be substantially reduced.

The user interface 10 comprises the display unit 11 and the input unit 12, wherein the display unit 11 and the input unit 12 are combined in a touchscreen monitor. The display unit 11 has a data connection to the camera interface 4 and is configured to present the image recorded in each case by the monitoring camera 2 in a real-time presentation. The user interface 10 furthermore has a data connection to the calculation unit 8 and the masking unit 9 so that the false event area 5 can be presented and/or marked in the image presented in the display unit 11 for the respectively set alarm specifications. The false event area 5 can be presented in the image of the monitoring area 3 displayed by the display unit 11 by means of hatching and/or coloring of the corresponding area.

By means of the input unit 12, a user can define at least one further false event area 5 in the monitoring area 3 through user input. This is done, for example, through the selection and/or marking of the corresponding area in the display of the image of the monitoring area 3. The marking area thus added is forwarded to the alarm unit 15 and the image analysis unit 6 in a similar manner to the marking area determined by the calculation unit 8. This may be useful, for example, if a user knows that a new source for false detection and/or false alarms is added in a specific area.

A masking storage unit 16 is also disposed between the masking unit 9, the alarm unit 15 and the image analysis unit 6. The masking storage unit 16 is configured as a storage unit integrated into the detection device 1 or as an external storage medium which is connected via a wireless or wired data connection to the masking unit 9. The masking storage unit 16 is configured to store the false event area(s) 5 calculated and/or defined by the calculation unit 8 and the alarm specifications modified by the marking unit 9 and the area to be excluded from the determination of event specifications.

Figure 2:
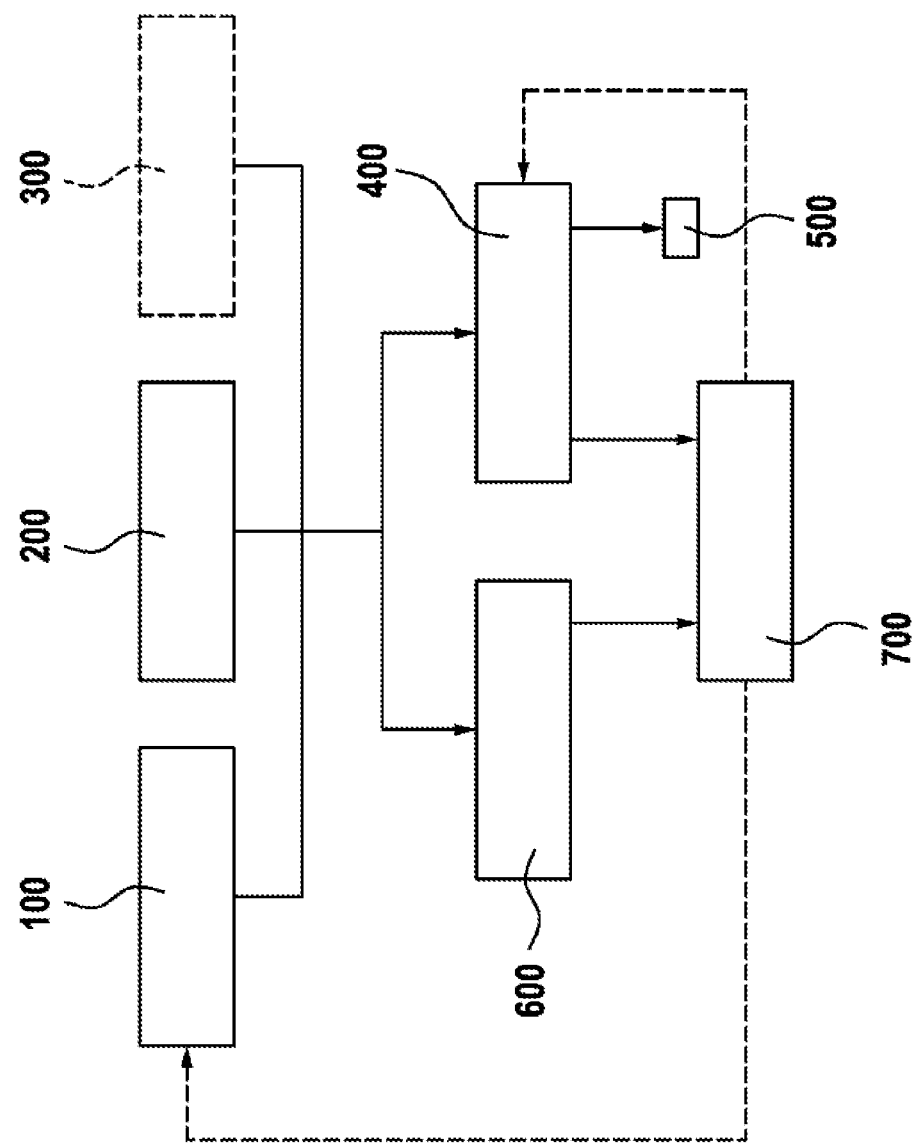
FIG. 2 shows a flow diagram of a method for detection of an event in a monitoring area.

FIG. 2 shows a flow diagram of a method for determining an event in a monitoring area 3 based on a comparison of alarm specifications and event specifications.

In an event specification determination step 100 of the method, an image of the monitoring area 3 is evaluated, wherein this evaluation comprises the determination of event specifications. The event specifications comprise specifications which meaningfully characterize the event that is to be detected.

In parallel with the event specification determination step 100, the monitoring area 3 is divided into a grid in a position determination step 200 and grid positions 13, wherein the grid positions 13 are the positions in the monitoring area 3 for which the event specifications are determined. An additional data determination step 300 for determining additional information at the grid positions 13 can be carried out in parallel with this position determination step 200. The additional information comprises, for example, data which contain further information relating to the image recording, the image evaluation and/or the event that is to be determined. This additional information is, for example, the sensitivity of the detection device 1 and/or monitoring camera 3, the magnitude of the event in the monitoring area 3 or a timestamp.

The data determined in the event specification determination step 100, the position determination step 200 and the additional information determination step 300 are evaluated in an alarm signaling step 400. In the alarm signaling step 400, a check is carried out to ascertain whether the event specifications exceed or understep certain alarm specifications. In the alarm signaling step 400, an alarm triggering 500, for example, is instigated if the alarm specifications are exceeded by the event specifications. No alarm is triggered if the alarm specifications are understepped by the event specifications. The data determined in the event specification determination step 100, in the position determination step 200 and in the additional information determination step 300 are stored in a storage step 600. In particular, the data determined there are determined as a data tuple. The data tuple comprises, for example, grid positions 13, event specifications and additional specifications. The stored data of the data tuple and the data of the alarm signaling step 400 are evaluated in a masking step 700. In the masking step 700, the location of a false event area 5 in the monitoring area 3 is calculated and/or defined on the basis of the event specifications and the alarm specifications. The false event area 5 determined in this way is forwarded to the event specification determination step 300 and the alarm signaling step 400. In the event specification determination step 100, the masking step 700 thus adjusts the area for which an evaluation and/or determination of event specifications is/are subsequently carried out. In addition, the masking step 700 can access the alarm specifications of the alarm signaling step 400, wherein the alarm specifications are adjusted in such a way that no event is detected for the event specifications stored in the storage step 600.

The invention claimed is:
1. A detection device (1) for detection of an event in a monitoring area (3), the detection device comprising:

a camera interface (4) for transferring at least one image, wherein the at least one image shows the monitoring area (3), an image analysis unit (6), wherein the image analysis unit (6) is configured to determine event specifications for at least any one position in the monitoring area (3) on the basis of the image, an alarm unit (15) with alarm specifications, wherein the alarm unit (15) is configured to define an alarm on the basis of a comparison of the alarm specifications with the event specifications, a storage unit (14), wherein the storage unit (14) is configured to store the event specifications for the at least any one position in the monitoring area (3), a calculation unit (8) configured to determine at least one false event area (5) on the basis of the event specifications and the alarm specifications, wherein the false event area (5) is an area of the monitoring area (3) in which the event is detected with selected alarm specifications even though the event has not actually occurred, and a masking unit (9) configured to (a) automatically modify the alarm specifications within the at least one false event area (5), (b) exclude the false event area (5) from the determination of event specifications by the image analysis unit (6), or both (a) and (b).

2. The detection device (1) as claimed in claim 1, wherein the modification of the alarm specifications by the masking unit (9) is a non-evaluation of a false event area (5) by the alarm unit (15).

3. The detection device (1) as claimed in claim 1, wherein the event specifications comprise information relating to the magnitude, duration, or intensity of an event or false event.

4. The detection device (1) as claimed in claim 1, wherein the calculation unit (8) is configured, following a manual modification of the alarm specifications, to redetermine the at least one false event area (5) on the basis of the event specifications.

5. The detection device (1) as claimed in claim 1, further comprising a user interface (10), wherein the user interface (10) is configured as a man-machine interface for modification of the alarm specifications.

6. The detection device (1) as claimed in claim 1, wherein a user interface (10) comprises a display unit (11) for the graphical display of the monitoring area (3) as a display image, wherein the display unit (11) is configured for the graphical display in the display image of the false event areas determined for the respective currently set alarm specifications.

7. The detection device (1) as claimed in claim 1, wherein a user interface (10) is configured to define manually by means of user input at least one area of the monitoring area (3) as an additional false event area (5).

8. The detection device (1) as claimed in claim 1, wherein a storage time is manually settable via a user interface (10) of the storage unit (14), wherein the storage time corresponds to the time duration of the event specifications stored by the storage unit (14).

9. The detection device (1) as claimed in claim 1, further comprising an adjustment unit, wherein the adjustment unit is configured to adjust the alarm specifications in such a way that a false event is not detected as an event for the stored event specifications in the monitoring area (3).

10. The detection device (1) as claimed in claim 1, wherein the event is a fire in the monitoring area (3).

11. The detection device (1) as claimed in claim 1, wherein the event is smoke in the monitoring area (3).

12. The detection device (1) as claimed in claim 1, wherein the event is a person in the monitoring area (3).

13. A method for detection of an event implemented with a detection device (1) as claimed in claim 1, wherein an image of the monitoring area (3) is evaluated and event specifications are determined for any position in the monitoring area (3), wherein an alarm is output on the basis of a comparison of the event specifications with alarm specifications, wherein the event specifications are stored and the position in the monitoring area (3) is stored for the event specifications, wherein the location of a false event area (5) in the monitoring area (3) is determined on the basis of the event specifications and the alarm specifications, and wherein (a) the alarm specifications are automatically modified in the false event area (5), (b) the false event area (5) is excluded from the further determination of event specifications, or both (a) and (b).

14. A non-transitory computer-readable media containing program code, that when executed on the detection device (1) as claimed in claim 1 cause the detection device (1) to
evaluate an image of a monitoring area (3) and determine event specifications for any position in the monitoring area (3), and
output an alarm on the basis of a comparison of the event specifications with alarm specifications, wherein the event specifications are stored and the position in the monitoring area (3) is stored for the event specifications, wherein the location of a false event area (5) in the monitoring area (3) is determined on the basis of the event specifications and the alarm specifications, and wherein (a) the alarm specifications are automatically modified in the false event area (5), (b) the false event area (5) is excluded from the further determination of event specifications, or both (a) and (b).

* * * * *